UNITED STATES PATENT OFFICE.

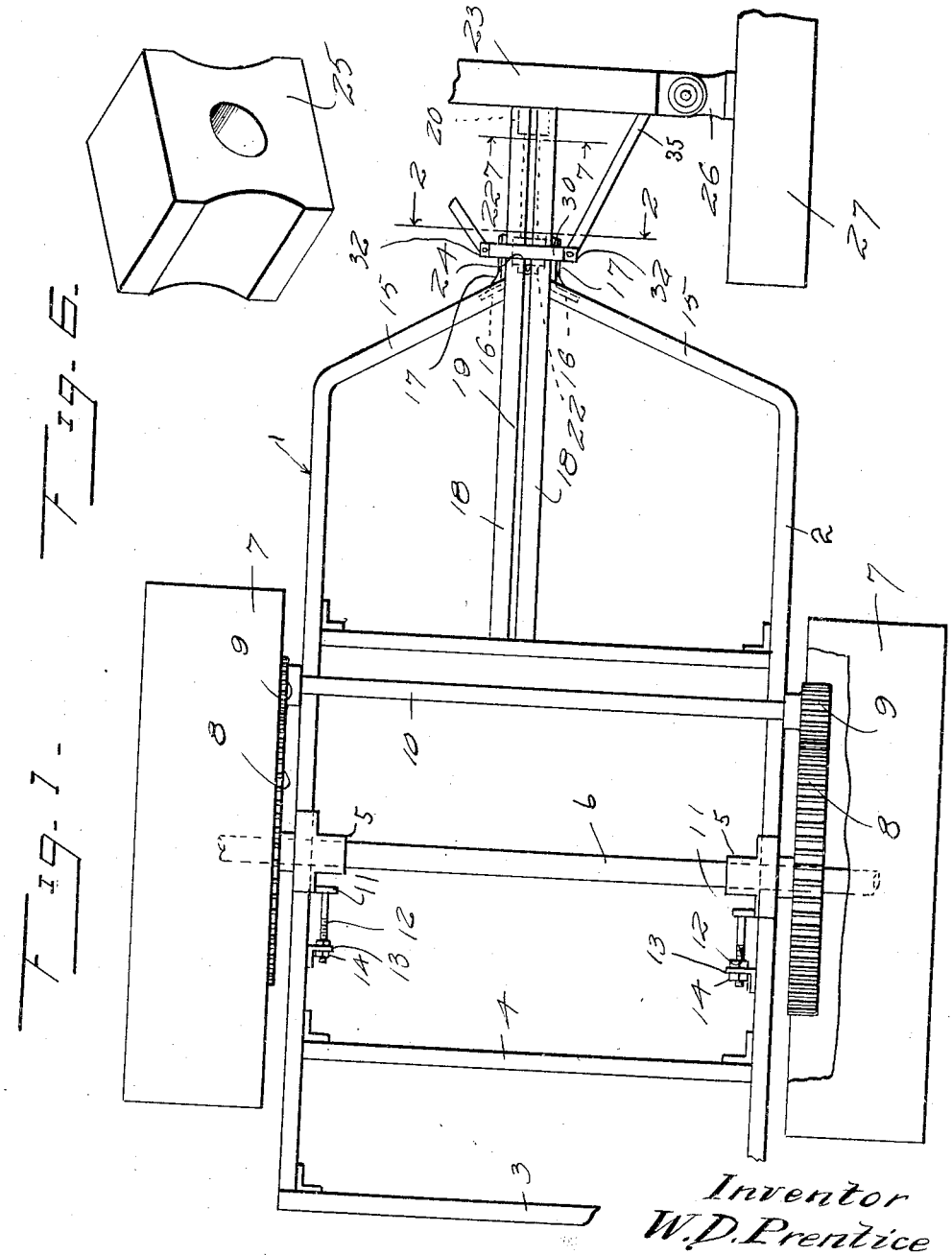

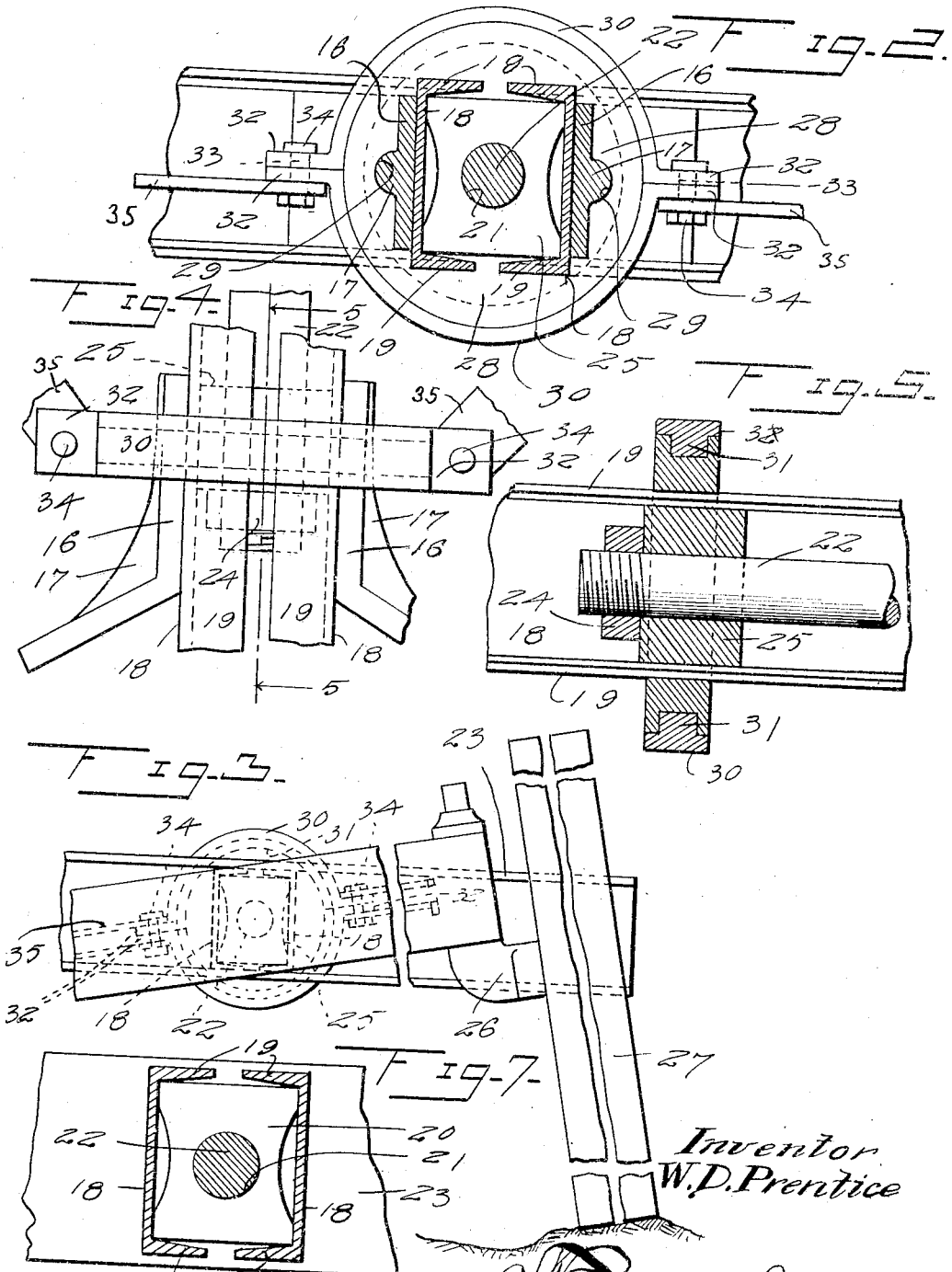

WILLIAM D. PRENTICE, OF FARGO, NORTH DAKOTA.

TRACTOR-FRAME.

1,354,128.    Specification of Letters Patent.    Patented Sept. 28, 1920.

Application filed October 25, 1919. Serial No. 333,190.

*To all whom it may concern:*

Be it known that I, WILLIAM D. PRENTICE, a citizen of the United States, residing at Fargo, in the county of Cass and State of North Dakota, have invented certain new and useful Improvements in Tractor-Frames; and I do hereby declare the following to be a full, clear, and exact description of the invention, such as will enable others skilled in the art to which it appertains to make and use the same.

This invention relates to new and useful improvements in tractor frames of the character in which radius rods are used for bracing the front axle and has for one of its objects the provision of means for permitting the axle to freely raise and lower at each end without affecting the frame, and also permits the radius rods to move correspondingly with the movement of the ends of the axle.

Another object of this invention is the provision of a bearing for connecting the radius rods to the frame which permits free movement of the radius rods about a horizontal axis and which will anchor said radius rods against endwise movement so as to take up end thrust of the front axle.

A further object of this invention is the provision of a tractor frame of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:

Figure 1 is a fragmentary top plan view of a tractor frame constructed in accordance with my invention, Fig. 2 is a transverse sectional view taken on the line 2—2 of Fig. 1, illustrating the means of connecting the radius rods to the frame, Fig. 3 is a fragmentary front elevation, illustrating one end of the front axle elevated by an uneven place in the roadway, Fig. 4 is a fragmentary plan view of the coupling for connecting the radius rods to the frame, Fig. 5 is a longitudinal sectional view of the same, Fig. 6 is a perspective view of an inner bearing block, Fig. 7 is a transverse sectional view taken on the line 7—7 of Fig. 1, illustrating one of the inner bearing blocks supporting the shaft adjacent the front axle.

Referring in detail to the drawings, the numeral 1 indicates as an entirety a tractor frame consisting of side members 2 connected at their rear ends by an end member 3 and also connected throughout their length by spaced transversely extending members 4. Adjacent the rear end of the frame 1 are axle bearings 5 that are slidably mounted on the side members 2 in any desired manner and have journaled therein a rear axle 6, on which are secured rear drive wheels 7 provided with internal gears 8. The internal gears 8 mesh with pinions 9 secured to a transversely extending drive shaft 10. The drive shaft 10 is journaled in suitable bearings on the frame 1 and is adapted to receive rotation from any well-known power source on the frame 1 (not shown). The bearings 5 have formed thereon ears 11 to which are rotatably connected adjusting rods 12 that are screw threaded and extend through brackets 13 carried by the side members 2 of the frame and said rods have threaded thereon nuts 14 so that the location of the bearings 5 can be adjusted on the frame for the purpose of adjusting the internal gears 8 in relation to the pinions 9 for compensating or taking up the wear between the internal gears and the pinions.

The forward portions of the side members 2 are curved inwardly and forwardly as illustrated at 15 and have their ends secured to angle brackets 16 which have formed upon their outer faces reinforcing ribs 17. Supporting bars 18 have their rear ends secured to the forward transverse connecting member 4 and are arranged in close relation to each other and extend between and beyond the brackets 16 and said brackets are connected to the supporting members 18 in any well known manner. Each of the supporting members 18 have horizontal upper and lower flanges 19. Secured in any desired manner between the forward end of the supporting members 18 is an inner supporting block 20. The bearing block 20 is provided with a central opening 21 to receive a supporting shaft 22 having its forward end secured to a front axle 23 in any well known manner and said supporting shaft extends rearwardly to a point between the brackets 16 and is screw threaded to receive a nut 24. The supporting shaft at its rear end extends through a supporting block 25 prior to receiving the nut 24 and said supporting block is confined between the supporting bars or members 18.

The front axle 23 has the supporting shaft 22 formed intermediate its ends and said axle is of the stub axle type having the steering knuckles 26 provided with the usual spindles on which are journaled the front wheels 27.

An inner bearing member 28 is provided with a substantially rectangular opening to receive the brackets 16 and supporting members 18 at a point about the inner supporting block 28 and the oppositely disposed side walls of the opening are provided with recesses 29 to receive the ribs 17 of the brackets 16 for preventing the inner bearing member 28 from having rotation in relation to said brackets and the supporting members 18. The inner bearing member 28 is secured in place in any well known manner and has an annular groove 30 formed in its periphery to receive an annular flange 31 formed on an outer bearing member 32 that surrounds the inner bearing member and consists of a pair of sections which have outstanding ears 32 provided with openings 33 for receiving fasteners or bolts 34. Each of the pair of ears 32 has connected thereto the rear ends of radius rods 35 by the bolts 34 and which radius rods have their forward ends secured in any well known manner to the front axle 23 adjacent its ends.

From the foregoing description taken in connection with the accompanying drawings, it will be noted that the axle is mounted for pivotal movement about a horizontal axis so that each end is free to move upwardly and downwardly when the front wheels pass over uneven places in the roadway. Further it is to be noted that the radius rods can move about a horizontal axis to correspond with the movement of the ends of the front axle and also are prevented from having endwise movement so as to take up end thrusts of the front axle.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A tractor frame including a frame, supporting members secured to said frame, means connecting the frame to the supporting members adjacent the forward ends, a front axle, means connecting the front axle to the supporting members to permit the front axle to have pivotal movement about a horizontal axis, radius rods connected to said axle, and means carried by the supporting members and connected to the radius rods to permit said rods to have pivotal movement about a horizontal axis.

2. A tractor frame including a frame, a supporting member secured to said frame, spaced bearing blocks in said supporting member, a front axle, a supporting shaft secured to the axle and extending through said blocks to permit the axle to have pivotal movement about a horizontal axis, radius rods connected to the axle, and a bearing carried by the supporting member and connected to the radius rods to permit said rods to have pivotal movement about a horizontal axis.

3. A tractor frame including side members having their forward ends curved inwardly, a supporting member secured to the side members and extending forwardly thereof, spaced supporting blocks in said supporting member, a front axle, a shaft formed on the front axle and received by the bearing blocks, radius rods connected to said axle, a bearing member journaled on the supporting member and connected to the radius rods to permit said radius rods to have pivotal movement about a horizontal axis.

4. A tractor frame including side members having their forward ends curved inwardly, angular brackets secured to the forward ends of the side members and relatively spaced, a supporting member secured to said brackets and projecting forwardly and rearwardly thereof, means connecting the rear end of said supporting members to the side members, spaced supporting blocks in the forward end of the supporting member, a front axle, a shaft on the front axle and received by the supporting blocks, radius rods connected to said axle, an inner bearing member mounted on the brackets and the supporting member and having an annular groove in its periphery, a sectional outer bearing member surrounding the inner bearing member, annular flanges formed on the sections of the outer bearing member and received by the annular groove, outwardly directed ears formed on the sections of the outer bearing members and secured to the radius rods to permit said radius rods to have pivotal movement about a horizontal axis.

In testimony whereof I affix my signature in presence of two witnesses.

WILLIAM D. PRENTICE.

Witnesses:
 ALMA MILLER,
 C. P. MEINTZER.